Jan. 12, 1965 J. M. WALTER 3,165,009
TABLE DRIVE TRANSMISSION FOR MILLING PLANERS
Filed May 21, 1962 3 Sheets-Sheet 1
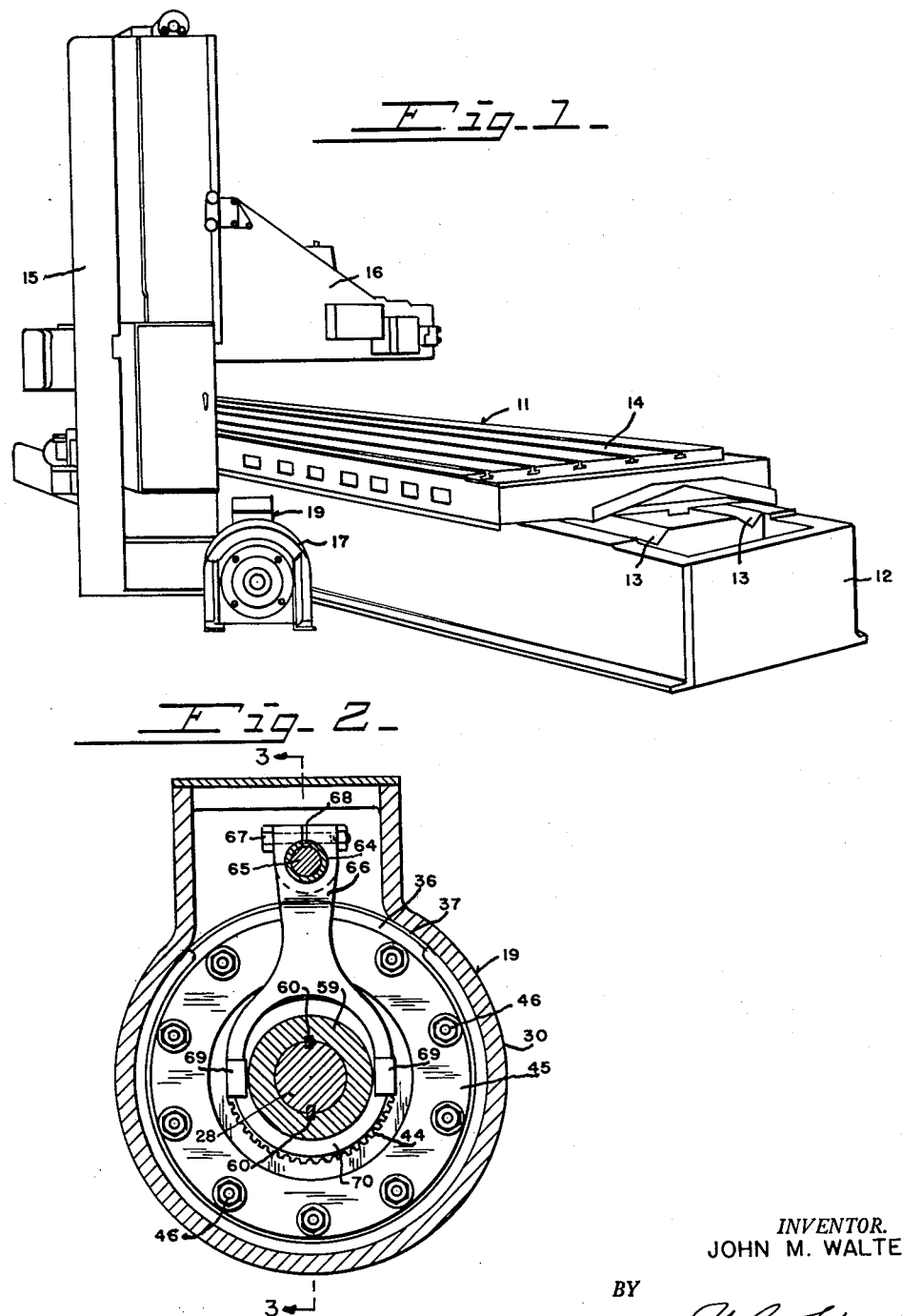
INVENTOR.
JOHN M. WALTER.
BY
*H.C. Karel.*
ATTORNEY.

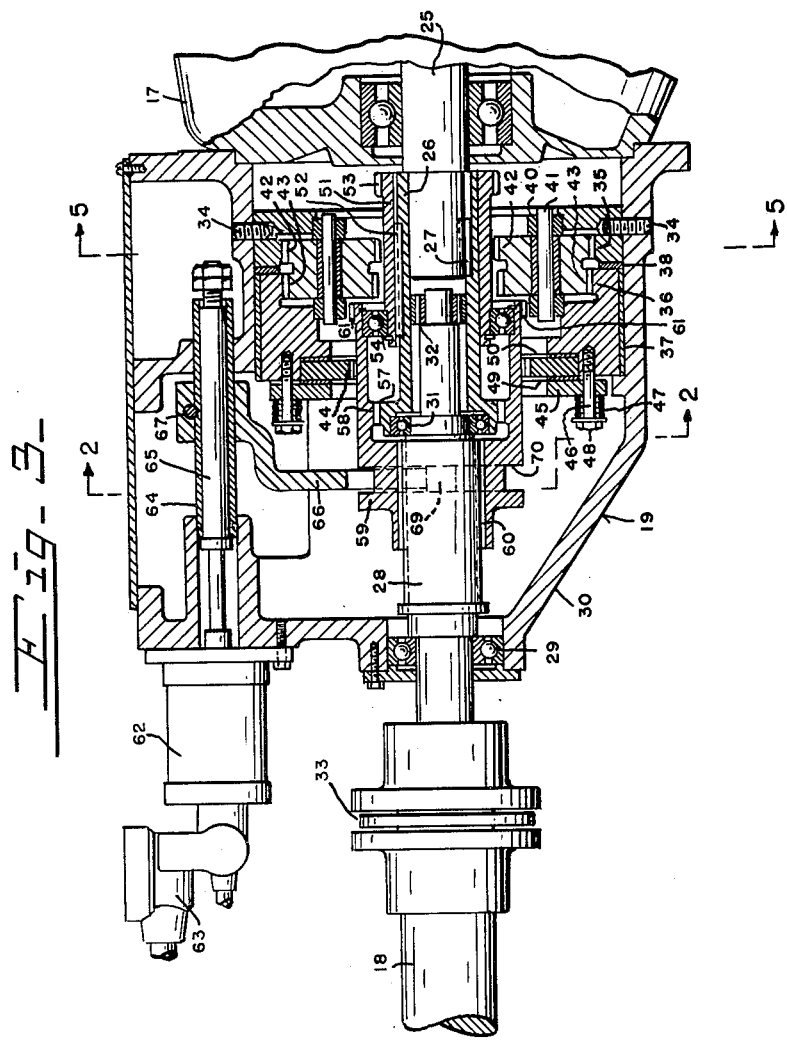

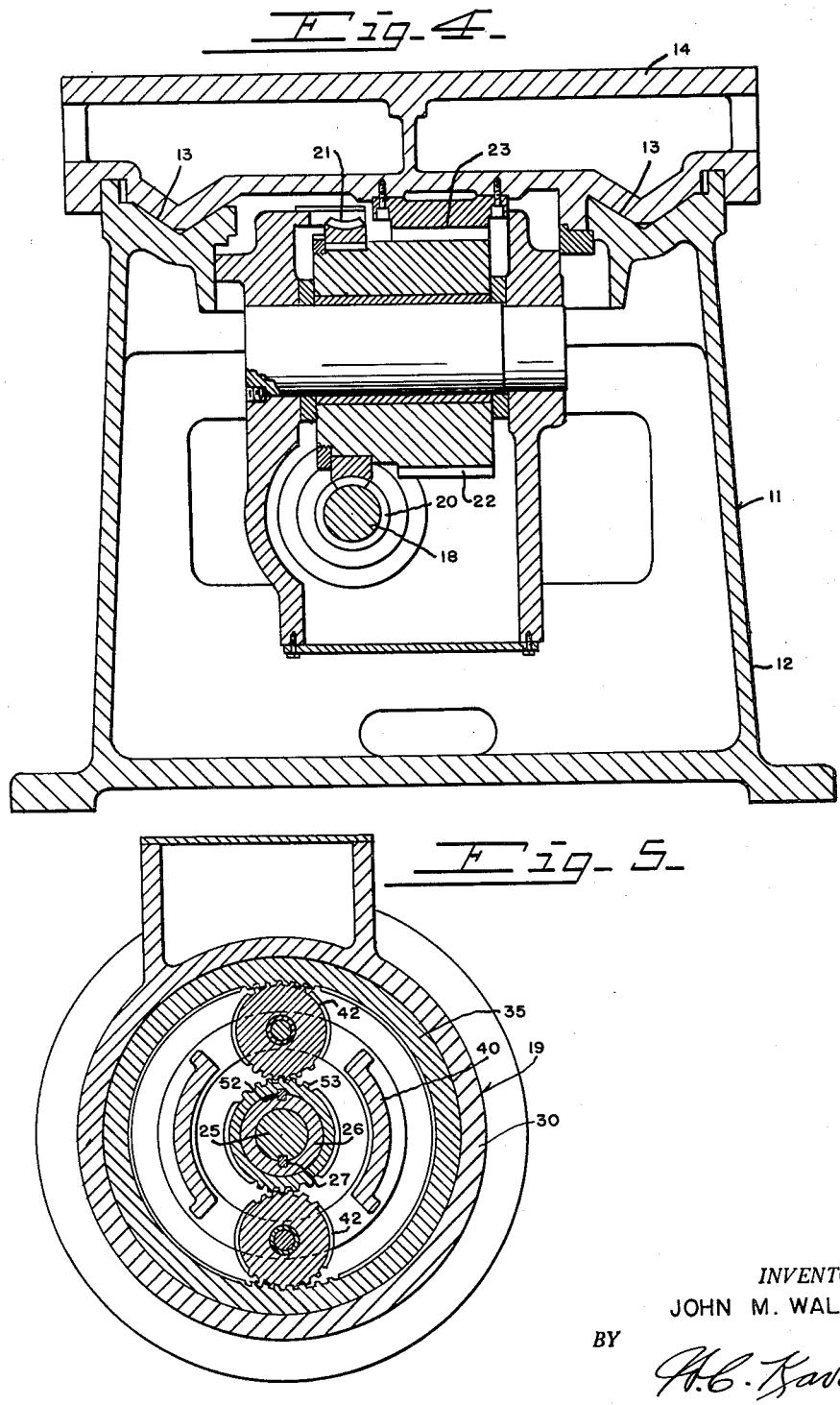

3,165,009
TABLE DRIVE TRANSMISSION FOR MILLING PLANERS
John M. Walter, Cincinnati, Ohio, assignor to The G. A. Gray Company, Cincinnati, Ohio, a corporation of Ohio
Filed May 21, 1962, Ser. No. 196,149
4 Claims. (Cl. 74—750)

This invention relates to an improved table drive primarily useful on combined milling and planer machines, wherein the table speed can be controlled from a very slow speed when milling to a greatly increased speed for planing operations and under both conditions to provide a rapid return of the table after each forward movement of the table.

In planing operations the table speed is governed by the cut and is comparatively rapid as related to milling operations, wherein the table speed is very slow. Therefore in a combination machine the table must be capable of moving at greatly diversified speeds.

The object of my invention is to provide a table drive which under certain conditions is driven direct from a variable speed electric motor.

A further object is to provide a planetary gear arrangement for greatly decreasing the speed of the table drive.

A further object is to provide a transmission wherein the planetary gears remain stationary when the direct drive is employed.

A further object is to provide novel means for changing from one drive to the other.

A further object is to provide remote means for changing the speed of the driven shaft.

My invention will be further readily understood from the following description and claims, and from the drawings, in which latter:

FIG. 1 is a rear perspective view of a milling planer to which my improvement is applied.

FIG. 2 is a vertical section of the improved transmission, taken in the plane of the line 2—2 of FIG. 3.

FIG. 3 is a longitudinal section of the transmission, taken in the plane of the line 3—3 of FIG. 2.

FIG. 4 is a vertical cross-section of the milling planer, showing the table drive.

FIG. 5 is a vertical section of the transmission, taken in the plane of the line 5—5 of FIG. 3.

My improved table drive transmission is used in connection with a milling planer 11, having a base 12 provided with ways 13 on which a table 14 moves longitudinally. A supporting structure 15 carries a vertically movable knee 16 provided with a cross-rail on which the tool carrying head is movable horizontally.

The table is reciprocated on the bed by means of a variable speed reversing electric motor 17 which drives a shaft 18 through a transmission 19. The shaft 18 has a worm 20 meshing with a worm wheel 21 keyed to a gear 22 which meshes with a rack gear 23 secured to the lower face of the table 14.

The transmission 19 which is the basis of this application is designed to provide varying table feed speeds from a maximum of 300 feet per minute to a minimum of one inch per minute. The motor is a variable speed reversing motor ranging from a maximum of 1800 r.p.m. to 45 r.p.m., and through the transmission the milling feed rates of the table are variable from one inch to forty inches per minute, through the ninety to one reduction. These rates are given as an example and it is understood designs may vary this arrangement.

The motor shaft 25 of the motor 17 has a sleeve 26 keyed thereto by a key 27. A second shaft 28 in alignment with the motor shaft is journalled in a bearing 29 in the housing 30, a bearing 31 in the end of the sleeve 26 and a roller bearing 32 within the sleeve 26. The shaft 28 is coupled to the shaft 18 by a coupling 33.

Secured within the housing 30 by means of screws 34 is a fixed ring gear 35. A second ring gear 36 is rotatable within the housing, with bearing material 37 between the ring gear and housing and bearing material 38 between the respective ring gears. A supporting carrier 40 is journalled in the respective ring gears 35 and 36. A pair of shafts 41 fixed in the carrier have double planet gears 42 and 43 rotatable on the shafts 41 meshing with the respective ring gears 35 and 36. A toothed ring 44 is frictionally held to the ring gear 36 by a clamp ring 45 being held against the ring gear 36 by means of bolts 46 extending through the clamp ring 45 and threaded into the ring gear 36 with springs 47 interposed between the nuts 48 and the clamp ring 45. Friction rings 49 and 50 frictionally hold the toothed ring 44 to the ring gear 36 under urging of the springs 47 thereby forming a slip clutch.

A sleeve 51 is slidable endwise on the sleeve 26 and rotates with the sleeve 26 being keyed thereto by a key 52. One end of the sleeve 51 has a gear 53 thereon and the other end carries a ball bearing 54. The sleeve 26 extends beyond the sleeve 51 and its end is journalled on the shaft 28 by the ball bearing 31 and the roller bearing 32 on the reduced end of the shaft 28. A toothed element 57 on the end of the sleeve 26 is engaged by a toothed element 58 on a sliding sleeve 59 keyed to the shaft 28 by keys 60. The other end of the sliding sleeve 59 has a toothed element 61 engageable with the toothed ring 44. This end of the sliding sleeve 59 is carried by the ball bearing 54.

Mounted on the upper part of the housing is an air cylinder 62 and valve 63 which operates a sliding sleeve 64 on the air cylinder rod 65. A shifting yoke 66 is clamped to the sleeve 64 by a bolt 67 through the split end 68 of the yoke 66. The other end of the yoke 66 has arms 69 engaged in an annular groove 70 in the sliding sleeve 59.

When the machine is used for planing, the drive from the motor 17 to the rack gear 23 is direct and the speed of the table is governed by the variable speed motor. Under this condition the planet gears 42 and 43 are inactive due to the shifting yoke 66 being in the position shown in FIG. 3, and consequently the ring gears are also stationary. The motor shaft 25 drives the keyed sleeve 26 which through the toothed element 57 meshing with the toothed element 58 on the sliding sleeve 59 rotates the sleeve 59 for driving the shaft 28.

When milling operations are performed on the machine, a much slower table feed is required. The air cylinder is operated from a suitable remote control position to shift the yoke 66 to the left as viewed in FIG. 3, causing the toothed elements 57 and 58 to disengage and the gear 53 to engage the planet gears 42 which rotate in the fixed ring gear 35 and rotate the carrier 40 causing the smaller planet gears 43 to rotate the ring gear 36 and frictionally held toothed ring 44 which is engaged by the toothed element 61 on the sliding member 59 for imparting rotation to the shaft 28 for obtaining a ninety to one reduction in the r.p.m. of the shaft 28 as related to the motor shaft 25.

The electrical remote control and the means for operating the air cylinder are not shown as they are well known in the art.

This improvement provides a compact, low cost novel transmission with inactive planetary gears when planing and novel means for easily and quickly engaging the planetary gear train for greatly reducing the speed for milling operations. With this improved transmission present planers can be converted to milling planers.

Having thus fully described my invention, what I claim as new and desire to secure by Letters Patent, is:

1. A table drive transmission for a milling planer having a base and a reciprocating table thereon driven by a gear and rack comprising;
   (a) a variable speed power source provided with an extending shaft,
   (b) a housing secured to said power source,
   (c) a drive shaft in said housing in alignment with said extending shaft and having driving connection with said gear and rack drive,
   (d) said shafts selectively connectible by a plurality of sleeves,
   (e) one of said sleeves keyed to said extending shaft,
   (f) a sliding sleeve provided with gear teeth on one end thereof keyed to said sleeve which is keyed to said extending shaft,
   (g) a sliding sleeve provided with teeth on one end thereof keyed to said drive shaft and having coupling connection with said sleeve which is keyed to said extending shaft for direct drive,
   (h) a pair of ring gears one stationary and one rotatable which has a toothed element connected thereto for selectively coupling to the teeth on said sliding sleeve keyed to said drive shaft,
   (i) planet gears meshing with said ring gears, and
   (j) a shifting yoke for moving said sliding sleeves for connecting said drive shaft direct from said power source and rendering said planet gears nonrotative or moving said sliding sleeves for connection through said planet gears from said power source to said drive shaft and rendering said direct drive inactive.

2. A table drive transmission for a milling planer having a base and a reciprocating table thereon driven by a gear and rack comprising;
   (a) a variable speed power source provided with an extending shaft,
   (b) a housing secured to said power source,
   (c) a drive shaft in said housing in alignment with said extending shaft and having driving connection with said gear and rack drive,
   (d) said shafts selectively connectible by a plurality of sleeves,
   (e) one of said sleeves keyed to said extending shaft,
   (f) a sliding sleeve provided with gear teeth on one end thereof keyed to said sleeve which is keyed to said extending shaft,
   (g) a sliding sleeve provided with teeth on one end thereof keyed to said drive shaft and having coupling connection with said sleeve which is keyed to said extending shaft for direct drive,
   (h) a planetary gear train including planet gears engageable by the gear teeth on said sliding sleeve which is keyed to said sleeve which is keyed to said extending shaft,
   (i) a pair of ring gears in said planetary gear train one stationary and one rotatable which has a toothed element connected thereto for selectively coupling to the teeth on said sliding sleeve keyed to said drive shaft,
   (j) said rotatable ring gear provided with a safety slip clutch, and
   (k) a shifting yoke for moving said sliding sleeves for connecting said drive shaft direct from said power source and rendering said planet gears non-rotative or moving said sliding sleeves for connection through said planet gears from said power source to said drive shaft and rendering said direct drive inactive.

3. A table drive transmission for a milling planer having a base and a reciprocating table thereon driven by a gear and rack comprising;
   (a) a variable speed power source provided with an extending shaft,
   (b) a housing secured to said power source,
   (c) a drive shaft in said housing in alignment with said extending shaft and having driving connection with said gear and rack drive,
   (d) said shafts selectively connectible by a plurality of sleeves,
   (e) one of said sleeves keyed to said extending shaft,
   (f) a sliding sleeve provided with gear teeth on one end thereof keyed to said sleeve which is keyed to said extending shaft,
   (g) a sliding sleeve provided with teeth on one end thereof keyed to said drive shaft and having coupling connection with said sleeve which is keyed to said extending shaft for direct drive,
   (h) a planetary gear drive in said transmission consisting of:
   (i) a ring gear secured in said housing,
   (j) a carrier rotatable in said housing,
   (k) a second ring gear rotatable in said housing,
   (l) said carrier supporting dual planet gears meshing with said respective ring gears,
   (m) a toothed ring frictionally held to said second ring gear and engageable by said teeth on said sliding sleeve keyed to said drive shaft,
   (n) said planet gears meshing with said ring gear secured in said housing engageable by the gear on said sliding sleeve which is keyed to the sleeve which is keyed to said extending shaft, and
   (o) a shifting yoke for moving said sliding sleeves for connecting said drive shaft direct from said power source and rendering said planet gears non-rotative or moving said sliding sleeves for connection through said planet gears from said power source to said drive shaft and rendering said direct drive inactive.

4. A table drive transmission for a milling planer having a base and a reciprocating table thereon driven by a gear and rack comprising;
   (a) a variable speed power source,
   (b) a housing in alignment with said power source,
   (c) an extending shaft having connection with said power source,
   (d) a drive shaft in said housing in alignment with said extending shaft and having driving connection with said gear and rack drive,
   (e) said shafts selectively connectible by a plurality of sleeves,
   (f) one of said sleeves keyed to said extending shaft,
   (g) a sliding sleeve provided with gear teeth on one end thereof keyed to said sleeve which is keyed to said extending shaft,
   (h) a sliding sleeve provided with teeth on one end thereof keyed to said drive shaft and having coupling connection with said sleeve which is keyed to said extending shaft for direct drive,
   (i) a planetary gear drive in said transmission consisting of:
   (j) a ring gear secured in said housing,
   (k) a carrier rotatable in said housing,
   (l) a second ring gear rotatable in said housing,
   (m) said carrier supporting dual planet gears meshing with said respective ring gears,
   (n) a toothed ring frictionally held to said second ring gear and engageable by said teeth on said sliding sleeve keyed to said drive shaft, (o) said planet gears meshing with said ring gear secured in said housing engageable by the gear on said sliding sleeve which is keyed to the sleeve which is keyed to said extending shaft, and (p) a shifting yoke for moving said sliding sleeves for connecting said drive shaft direct from said power source and rendering said planet gears non-rotative or moving said sliding sleeves for connection through said planet gears from said power source to said drive shaft and rendering said direct drive inactive.

References Cited by the Examiner

UNITED STATES PATENTS

| | | | |
|---|---|---|---|
| 1,479,292 | 1/24 | Farley | 74—750 |
| 1,745,075 | 1/30 | Wise | 74—740 |
| 2,583,556 | 1/52 | Fleischel | 74—785 |
| 2,884,812 | 5/59 | Reis | 74—751 |
| 2,971,406 | 2/61 | Senkowski et al. | 74—785 |

DON A. WAITE, *Primary Examiner.*